Dec. 20, 1960                R. L. SINCLAIR                2,965,238
DISPLAY DEVICE FOR EDGEWISE MOUNTING OF ELONGATED ARTICLES
Original Filed May 27, 1957                              4 Sheets-Sheet 1

INVENTOR.
ROBERT L. SINCLAIR,
BY
ATTORNEY.

Dec. 20, 1960 R. L. SINCLAIR 2,965,238
DISPLAY DEVICE FOR EDGEWISE MOUNTING OF ELONGATED ARTICLES
Original Filed May 27, 1957 4 Sheets-Sheet 2

INVENTOR.
ROBERT L. SINCLAIR,
BY
ATTORNEY.

Dec. 20, 1960   R. L. SINCLAIR   2,965,238
DISPLAY DEVICE FOR EDGEWISE MOUNTING OF ELONGATED ARTICLES
Original Filed May 27, 1957   4 Sheets-Sheet 3

INVENTOR.
ROBERT L. SINCLAIR,
BY
ATTORNEY.

Dec. 20, 1960 R. L. SINCLAIR 2,965,238
DISPLAY DEVICE FOR EDGEWISE MOUNTING OF ELONGATED ARTICLES
Original Filed May 27, 1957 4 Sheets-Sheet 4

INVENTOR.
ROBERT L. SINCLAIR,
BY
ATTORNEY.

United States Patent Office 2,965,238
Patented Dec. 20, 1960

2,965,238
DISPLAY DEVICE FOR EDGEWISE MOUNTING OF ELONGATED ARTICLES

Robert L. Sinclair, Dedham, Mass., assignor to Paper Mate Manufacturing Company, Culver City, Calif., a corporation of Delaware Continuation of application Ser. No. 661,928, May 27, 1957. This application July 5, 1960, Ser. No. 40,962

26 Claims. (Cl. 211—69)

This invention relates to a device for attractively displaying elongated articles, instruments or objects in a novel manner, and more particularly to a display device for elongated articles including an article holding means or sales package extending from the article for a distance several times the width or lateral dimension of the elongated article. This application is a continuation of my application Serial No. 661,928, filed May 27, 1957, now abandoned, and is substituted therefor.

Writing instruments which are exemplary of elongated articles to which this invention relates, are usually displayed on counters of retail establishments and self-service stores where they may be readily examined by prospective purchasers. It is desirable that such a display be attractive and such attractiveness should not be diminished by or suffer from removability of writing instruments when sold. Moreover, since writing instruments are relatively small, readily pocketable, and easily subject to pilferage, a display device should include means to discourage and inhibit surreptitious concealment on one's person and pilferage. In addition, limited space requirements for display of such instruments make is desirable that a maximum number of writing instruments be shown in a selected space and that all writing instruments displayed be readily visible.

Prior devices and methods of displaying writing instruments generally comprised mounting a number of writing instruments on a planar face of a background card, as shown in United States Letters Patent Nos. 808,596; 1,877,840 and 2,549,568. Writing instruments mounted on a front, flat face of such a supporting card were usually removable and capable of being filched or pilfered. Moreover, removal of some of the total number of writing instruments from the card left gaps or openings on the face of the card and the display was then unattractive.

The present invention contemplates a pilfer deterring display device and sales package for an elongated article of merchandise which may be displayed in various retail establishments such as self-service stores and the like for direct handling by customers and prospective purchasers. The device and package includes a virtually stiff card-like panel having surface dimensions greatly exceeding the thickness of an article mounted thereon and sufficiently extensive in area to inhibit pilfering and impeding pocketing or surreptitious concealment on a person. Securement means adjacent an edge of the panel permanently hold the article in fixed, firm, non-frictional association with the panel and include abutment portions blocking longitudinal movement of the article. The invention contemplates that the article be so held at the edge margin of the panel that the securement means or some part thereof must be virtually destroyed in order to separate and release the article from the panel.

The present invention contemplates a device for attractively displaying elongated articles in which a number of elongated articles may be each independently supported in close parallel relation upon an obscured frontal edge face of an article support means such as a card-like holding panel, the panels being supported to readily permit removal of an article and its associated panel from the display without disturbing other articles. The display device is constructed and arranged so as to hinder pilfering of the displayed articles while permitting examination and selection of an article by a prospective purchaser.

The primary object of this invention is to provide a novel, attractive, display device and sales package for elongated articles, instruments or the like.

An object of this invention is to disclose and provide a display device for elongated articles in which a plurality of such articles may be arranged in close parallel relation in such a manner that attention is focused primarily on the displayed articles and not on other parts of the display device.

Another object of this invention is to disclose and provide a display device for elongated articles wherein the instruments may be conveniently removed without detracting from the appearance of the remainder of the display.

A further object of this invention is to disclose and provide a display device for elongated articles wherein the articles are carried on narrow edge portions of holding panels which are generally obscured by the articles and which are thus made inconspicuous.

A further object of this invention is to disclose and provide a display device wherein elongated articles are supported on holding panels each of a size and shape so that an article and the associated holding panel cannot be readily inserted into a pocket or be otherwise conveniently concealed.

Still another object of this invention is to disclose and provide a display device for attractively presenting elongated articles wherein positioning and retaining means for each article is provided for mounting such an article in alignment with and on a narrow frontal edge portion of a holding panel, the frontal edge portion providing a display zone for an article.

A still further object of this invention is to disclose and provide a device for displaying elongated articles as described above wherein means are provided to releasably secure or lock a plurality of holding panels carrying such articles on frontal edge faces thereof.

Although the drawings described hereinafter illustrate a device for displaying writing instruments, it is to be understood that the present invention is not limited to the display of such instruments, but that it can be usefully applied to the display of almost any elongated article, by which is meant an article having a longitudinal dimension exceeding other dimensions of the article, such as lipsticks, eyebrow pencils, tall nail polish containers, tooth brushes, nail files, pocket knives, office knives, artist brushes, glass cutters, razor blade packages, specially packaged cigars, smoking pipes, pen-shaped flashlights, and the like. The advantages flowing from the present invention are of particular significance when the invention is used for the display of elongated articles which sell for a high enough price to make pilferage a serious problem.

Various and numerous other objects of this invention will be readily apparent to those skilled in the art from the following description of the drawings and exemplary embodiments of this invention shown therein.

For purposes of description and explanation of display devices embodying this invention a writing instrument such as a pen, pencil, and the like is used as an exemplary elongated article.

Generally speaking, each of the several embodiments or examples of this invention comprise a display device including a supporting means constructed to provide arrangement in vertical upright position of a plurality of thin, flat holding panels, each presenting a narrow frontal edge portion providing a display zone along which is positioned and retained a writing instrument such as a pen, pencil, and the like. The diameter of the writing instrument may be greater than the width of an edge face presented by the frontal edge portion so that the edge face is obscured or the diameter of the instrument may be less than the width of the edge face as described hereinafter. Since the holding panels are disposed edgewise to the writing instruments, the panels are rendered virtually inconspicuous. For clarity of description, each example (excluding the first shown in Figs. 1 to 4) will include reference numerals with a letter a, b, c, etc., to identify major components of the device of similar function.

In Figs. 1 to 4 inclusive, a supporting means 20 of a display device embodying this invention may comprise a suitable rectangular receptacle 21 of suitable material, such as rigid paper stock, cardboard, plastic, wood and the like. Receptacle 21 may include a bottom wall 22, front wall 23, back wall 24, and end walls 25, the top edges of all of said walls lying in a plane and defining a top rectangular opening 26. Within the receptacle 21 may be provided a false bottom insert member 27 of any suitable material providing a plurality of transverse parallel spaced indentations, slits, or grooves 28. Grooves 28 are adapted to position and receive narrow, elongated bottom edge portions 29 of a plurality of holding panels 30 arranged in parallel upstanding relation in the receptacle.

Each holding panel 30 forms a component part of a sales package embodying the invention and may be made of suitable rigid material such as paper or card stock, cardboard, plastic, wood, and the like. Each panel 30 may be polygonal in shape and of relatively large area. In this example, exposed upper display section 31 may be of triangular shape and lower base section 32 may be of rectangular shape. Rectangular section 32 is adapted to closely but easily fit between front and back walls 23, 24 and with its bottom edge portion 29 received in alignment within a groove 28. The upper triangular section 31 may include a narrow frontal edge portion 34 presenting a narrow, elongated forwardly and upwardly directed edge face 35. Face 35 may be of a width equivalent to the thickness of the stock of panel 30 and may lie in a plane approximately 45° to base section 32. Back edge portion 36 may be vertically disposed. The length of front edge face 35 may be less than the length of a writing instrument 37 to be presented thereon although in this example edge face 35 extends slightly beyond ends of the writing instrument. The polygonal shape and size of panel 30 is such that the panel 30 cannot be readily concealed or inserted into a purse, bag or a pocket.

Means for releasably securing a plurality of panels 30 in receptacle 31 may comprise an inverted J-slot 40 provided in lower section 32 of each panel 30 adjacent back wall 24. A short leg 41 of the J-slot may be spaced inwardly of back edge portion 36 of the panel. A long leg 42 of the J-slot may be formed at and coincide with the edge margin of back edge portion 36 and may extend to and be open at the bottom edge of panel 30. A locking member or securing rod 43 may extend longitudinally of receptacle 21 through J-slots 40 and panels 30. Each end of rod 43 may be received in an inverted, U-section slot 45 provided in each end wall 25, and aligned with the upper portion of the inverted J-slot 40. A knob 46 may be secured to each end of rod 43 to facilitate manipulation thereof. It will be apparent that the knobs 46 on rod 43 may be grasped, the rod 43 lifted upwardly and out of short leg 41 of the J-slots, moved rearwardly, and then lowered into long leg 42 of the J-slot 40. When rod 43 is thus positioned (Fig. 4), panels 30 may be readily removed from receptacle 21 by disengagement with rod 43 through the open end of long leg 42 of the slots.

Figure 1:
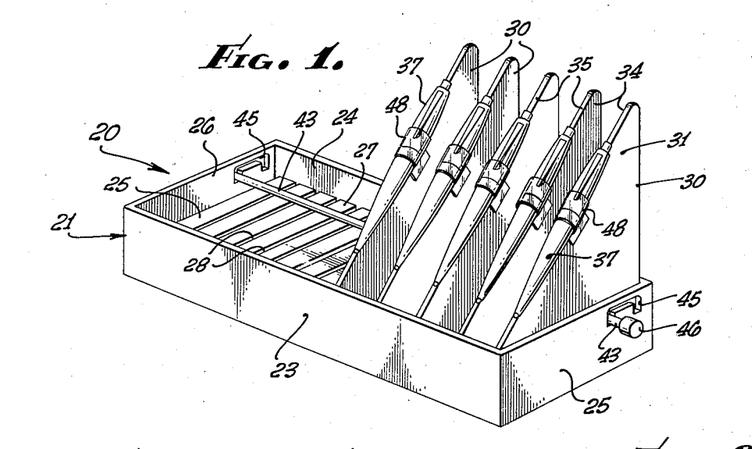
Fig. 1 is a front perspective view of a display device embodying this invention, only a few writing instruments and associated holding panels being shown.

Securement or holding means for positioning and retaining writing instruments 37 along the front edge portion 34 of panel 30, and in particular in alignment with and upon the longitudinal front inclined edge face 35, may include a short strip or piece of a pressure-sensitive, flexible adhesive tape 48, such as a transparent or opaque tape of well known manufacture. Tape 48 may be applied across the central portion of writing instrument 37 and may extend smoothly thereover and along opposite side surfaces of edge portion 44 of the holding panel. The width of tape 48 is sufficient to prevent lateral misalignment of writing instrument 37 with edge face 35. Tape 48 may thus securely retain writing instrument 37 on the holding panel 30 to restrain the writing instrument against lateral and longitudinal movement. One or more strips of wide tape or two spaced narrow bands of such tape may be used if desired.

When a plurality of holding panels 30 are thus equipped with writing instruments aligned and secured edgewise thereof and when panels 30 are positioned adjacent each other in receptacle 21, it will be apparent that the writing instruments may be positioned in parallel in a row with the instruments in side by side contact. As viewed from the front of the display device, holding panels 30 are substantially unnoticeable and the major portion of front edge faces 35 are obscured by writing instruments 37. Each holding panel and its securement means thus provide, in effect, a sales package for a writing instrument.

In a display device as shown in Figs. 1 to 4 inclusive, it will be readily apparent that a plurality of writing instruments of different colors and shape may be conveniently displayed. The writing instruments are not readily removable from the receptacle 21 except upon unlocking securing rod 43 to permit withdrawal of one or more of the writing instruments and associated holding panels 30. The holding panels 30 are not only maintained in vertical, upright position by the securing rod 43 in its engagement with J-slots, but also by the grooves 28 in the false bottom of the receptacle and by the close easy fitting of the rectangular lower sections 32 of the holding panels between the front and back walls of the receptacle.

In the embodiment of this invention shown in Figs. 5 to 8 inclusive, support means 20a, holding panel 30a and positioning and retaining means for the writing instrument function in substantially the same manner as in the prior embodiment, but are of different construction.

Figure 5:
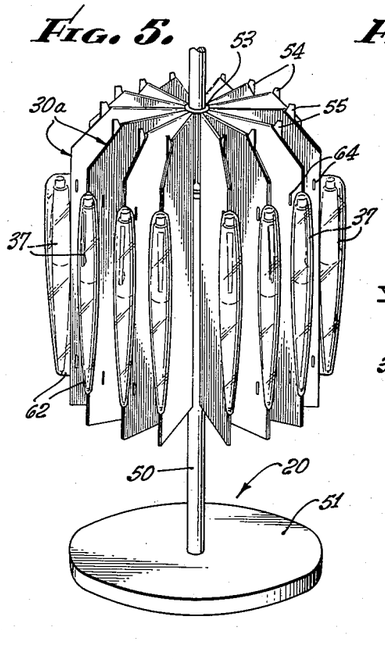
Fig. 5 is a perspective view of a different embodiment of a display device of this invention.

The display device may comprise the support means 20a including an upstanding standard, column or post 50 carried by a flat circular base 51. Circular base 51 may be of sufficient diameter to lend stability to the support means 20a, and if desired, may include weights (not shown) attached to the bottom face thereof. Post 50 may carry a fixed collar 52 spaced above base 51 for supporting a cylindrical sleeve or hub 53 to which may be secured a plurality of radially outwardly extending tapered support wings or elements 54. Hub 53 may rotate about post 50. If desired, hub 53 and each support wing 54 may be pivotally or hingedly connected (not shown) so as to provide relative pivotal movement of the support wing 54 with the hub 53. Each support wing 54 may be of any suitable shape and in this example, includes an upstanding end portion 55 defining a top horizontal edge 56 between end portion 55 and hub 53.

Figure 6:
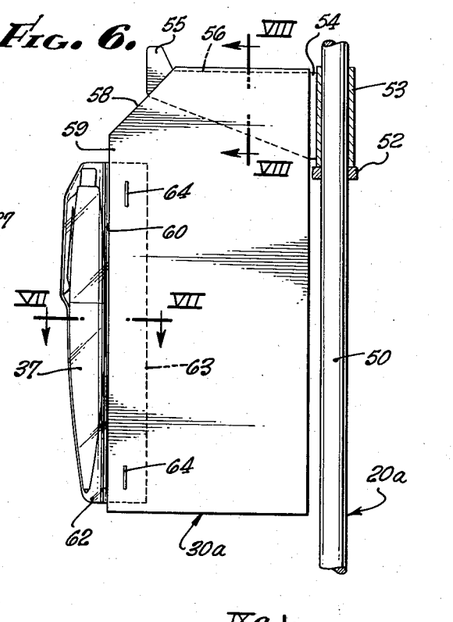
Fig. 6 is a view taken in a vertical plane passing through the axis of the device shown in Fig. 5 and between two holding panels.

Holding panel 30a may comprise an elongated, rectangular sheet of thin cardboard stock folded about its center lateral axis to provide a two-ply panel. A beveled or inclined edge 58 may be provided by cutting a V-notch in one side of the unfolded panel at its lateral axis. Below and forwardly or outwardly of beveled edge 58, holding panel 30a may be provided with a frontal, narrow, thin, edge portion 59 presenting a forwardly facing, narrow, elongated front edge 60 of double thickness of the sheet forming the holding panel 30a.

Panel 30a may be slipped over wing 54 with the fold at the lateral axis of the panel resting upon top edge 56 of the support wing 54. Beveled edge 58 provides a front opening through which the upturned portion 55 may extend for retaining the panel thereon.

Figure 7:
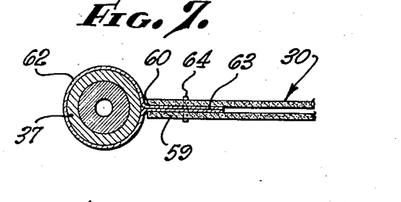
Fig. 7 is a sectional view taken in the plane indicated by line VII—VII of Fig. 6.
Figure 8:
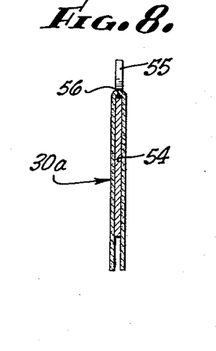
Fig. 8 is a fragmentary sectional view taken in the plane indicated by line VIII—VIII of Fig. 6.

In this example, securement means for supporting and retaining a writing instrument 37 against and in alignment with the front double edge 60 of the holding panel may comprise a transparent, elongated, preformed pod or casing 62 of suitable plastic material having sufficient length and width to completely enclose the writing instrument 37. The preformed pod 62 may fit snugly about the writing instrument 37, as shown in Fig. 7, and may be provided with longitudinally extending opposed securement flanges 63. Flanges 63 are brought together in face-to-face relation and inserted between folded portions of panel 30a. The pod 62 may then be secured to the panel 30a in any suitable manner as by spaced staples 64. It will thus be apparent that the writing instrument 37 is carried in alignment with front edge 60 of the holding panel 30a and obscures the frontal edge portion of the panel and is held against lateral and longitudinal movement by the pod 62. The writing instrument cannot be separated from the holding panel, except by breaking or unfastening staples 64 or by puncturing and slitting the pod.

It will be understood by those skilled in the art that the display device shown in Figs. 5 to 8 inclusive, provides a means for supporting a plurality of writing instruments in a circular arrangement and wherein each writing instrument is carried by a holding panel 30a which may be readily associated with the support wings 54 as by ensleeving the upper portion of the panels over the support wings.

Figure 9:
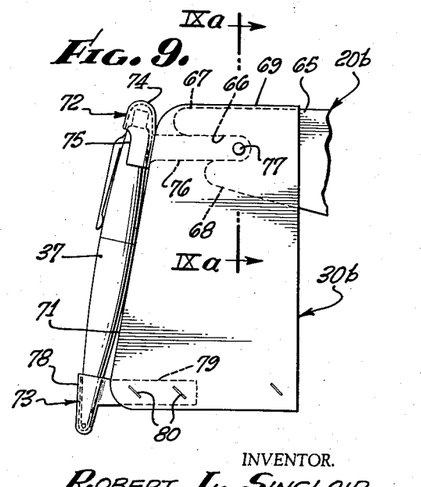
Fig. 9 is a fragmentary side view of another embodiment of the invention showing a modified holding panel and retaining means for a writing instrument.
Figure 9A:
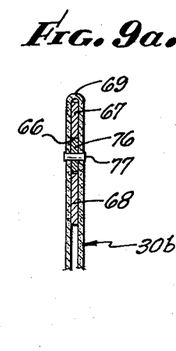
Fig. 9a is a transverse sectional view taken in the plane indicated by line IXa—IXa of Fig. 9.

The modification of the display device shown in Fig. 9 includes a support means 20b only fragmentarily shown and which may be supported in the manner of support element 54 (Fig. 5) or supported from a fixed rack or other means. The support means 20b may include a rigid thin support element 65 provided with an outwardly or frontally opening recess 66 defined by forwardly extended upper portion 67 of element 65 and by a lower portion 68 thereof.

Holding panel 30b may comprise an elongated sheet of rigid paper stock folded as in the prior embodiment so as to provide a fold edge 69 adapted to overlie the top edge of element 65 when the holding panel 30b is sleeved over the element 65 as shown in Fig. 9. In this example, the holding panel 30b is of generally trapezoidal shape.

Securement means for positioning and retaining a writing instrument 37 on a frontal double edge portion 71 of the holding panel 30b may comprise a hollow top hat member 72 and a bottom cup-like shoe member 73 which act as holding elements, retainers and abutments which prevent and block longitudinal movement of the writing instrument. Hat member 72 may comprise a hollow hat portion 74 adapted to receive and partially enclose the top end of writing instrument 37. Hat portion 74 may have a front opening 75 in which a retaining clip or other projection on writing instrument 37 may be received. Integrally formed with hat portion 74 may be a rearwardly extending member 76 having a width for snug reception within recess 66 of the support element 65. The member 76 may be provided with an oppositely and outwardly directed securement rivet or pin 77 extending through holding panel 30b for pivotally mounting the hat member 72 on panel 30b.

Bottom shoe 73 may include a hollow tip-receiving portion 78 to receive the bottom end of writing instrument 37. Integral with tip portion 78 may be an arm portion 79 which extends rearwardly between the folds of holding panel 30b, and which may be fixed thereto as by staples 80.

Writing instrument 37 may be assembled with holding panel 30b by inserting the tip of the instrument in shoe 73, lifting hat member 72 upwardly about its pivotal mounting (before panel 30b is held on support element 65) and then lowering the hat member over the top of the instrument. When the panel and instrument are so assembled, the panel 30b may be sleeved over support element 65 and the hat member 72 will be locked against pivotal movement about pin 77 by reception of member 76 in recess 66. When holding panel 30b and the writing instrument are removed from support element 65, member 72 may be pivoted about pivot 77 so as to permit removal of the writing instrument 37 from the shoe portion 73.

In the embodiment of the display device shown in Figs. 10 to 14 inclusive, a support means is not shown and may comprise the support means described in Figs. 1 to 4. In this embodiment writing instrument 37 may be positioned and retained on a front edge portion of a holding panel 30c by removable clip means generally indicated at 85.

Figures 12, 13, 14:
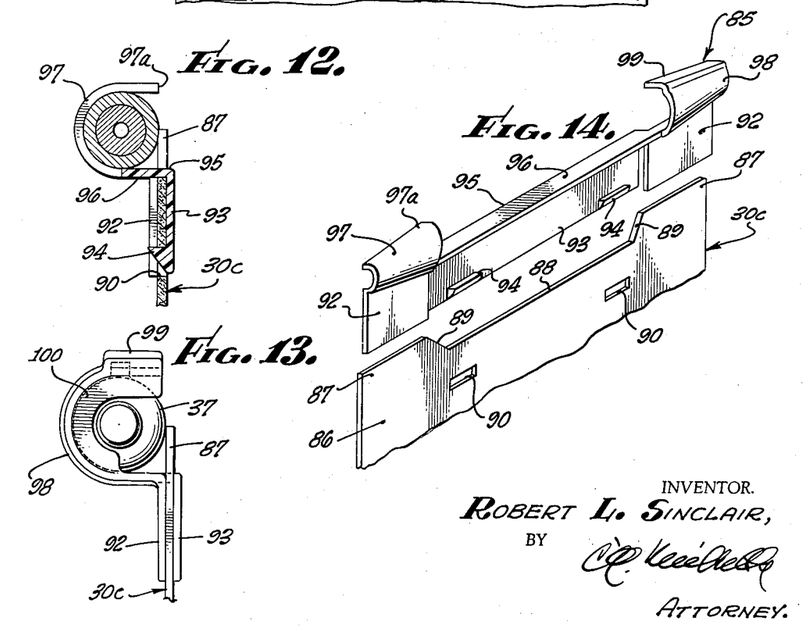
Fig. 12 is a fragmentary sectional view taken in a transverse plane indicated by line XII—XII of Fig. 10.
Fig. 13 is an end view taken from a plane indicated by line XIII—XIII of Fig. 10.
Fig. 14 is a fragmentary exploded perspective view of the positioning and retaining means and top portion of the holding panel shown in Fig. 10.

In this example, holding panel 30c may be of any desired polygonal shape and may be made of rigid paper stock, cardboard or other suitable rigid material. In Fig. 14 a frontal edge portion 86 of holding panel 30c may comprise spaced frontal extensions 87 at opposite ends of panel 30c defining therebetween an elongated central recess or depression 88. The top edges of the frontal extensions 87 and depression 88 may be joined by inclined edge portions 89. Spaced inwardly of depression 88 may be provided a pair of spaced rectangular openings or ports 90.

Clip means 85 may be made of any virtually rigid material such as plastic, metal and the like and may be transparent, opaque or colored. The clip means 85 may include a panel engagement section comprising end tabs 92 and a central laterally spaced wall 93 lying in a plane parallel to tabs 92. Tabs 92 are adapted to face and bear against one side face of extensions 87. Central wall 93 is adapted to bear against and face the opposite side of holding panel 30c between extensions 87. Wall 93 may be provided with a pair of spaced retaining lugs or hooks 94 which, in assembly, are aligned with and received within ports 90 to secure the clip means on the panel.

Integrally formed with the panel engagement section of clip means 85 may be a writing instrument mounting or retaining section 95 which may comprise an elongated, longitudinally extending flange 96 interconnecting tabs 92 and the central wall 93. The flange 96 extends along tabs 92 and may be integrally formed with sidewardly opening upwardly curved generally semicircular in section writing instrument retaining end portions 97 and 98. Retaining portion 97 may be of tapered semi-conical form to generally correspond with the shape of the writing end of instrument 37. End portion 97 may terminate in a straight edge 97a lying in the plane of the surface of tab 92 facing extension 87.

End portion 98 may likewise be longitudinally tapered, integrally formed with flange 96, and provided with a top planar section 99 which may overlie a clip or other projection on writing instrument 37. The portion 98 includes an end partially circular inturned lip 100 permitting a pin retracting element to extend therethrough and serving as an abutment means to prevent and block longitudinal movement of instrument 37.

Figure 10:
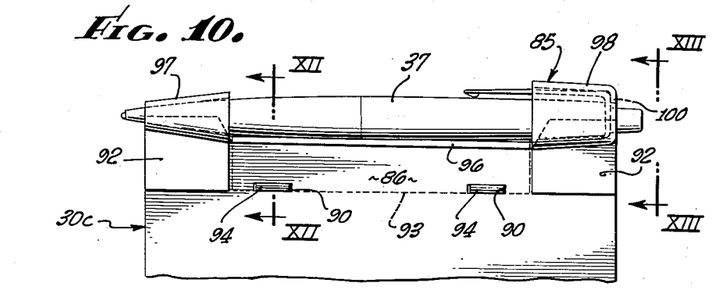
Fig. 10 is a fragmentary side view of a holding panel, writing instrument, and positioning and retaining means for the writing instrument showing still another embodiment of this invention.
Figure 11:
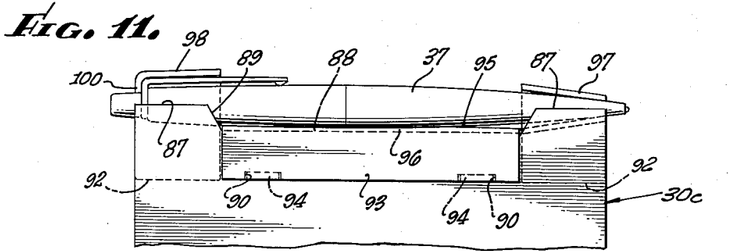
Fig. 11 is a fragmentary side view showing the opposite side of the construction shown in Fig. 10.

Writing instrument 37 may be assembled with the clip means 85 when the clip means is disassembled from holding panel 30c. The writing instrument is positioned by sidewise insertion in end retaining portions 97 and 98 and is seated in longitudinal alignment along an edge portion of flange 96. When clip means 85 with instrument 37 is assembled with holding panel 30c, the extensions 87 of the holding panel are moved along a plane lying between the laterally spaced planes of the end tabs 92 and wall 93 of the clip means so that as extensions 87 present one face in sliding engagement with the tabs 92, the central portion of the holding panel presents an opposite face in sliding engagement with the wall 93. As the clip means 85 and the holding panel 30c are urged into final assembled position, hooks 94 snap into ports 90 to securely retain the clip means 85 on the holding panel. In assembled position of clip means 85 with the holding panel, end extensions 87 extend upwardly and bear against writing instrument 37 to retain the writing instrument within the clip means. It will be noted that the writing end of the instrument extends beyond the holding means and panel and the instrument can be tested for writing ability while firmly connected to the panel.

Figure 15:
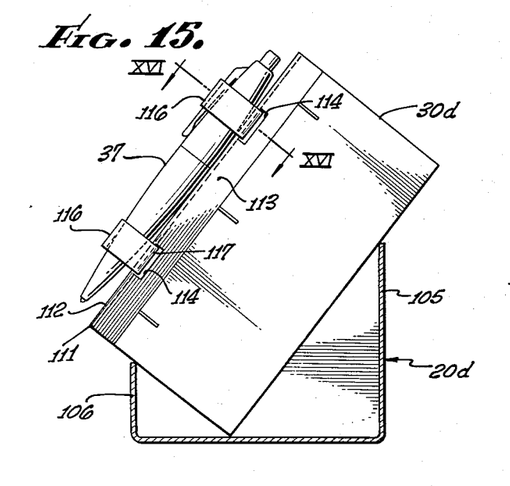
Fig. 15 is a transverse section view of an exemplary display device showing still another embodiment of this invention.
Figure 16:
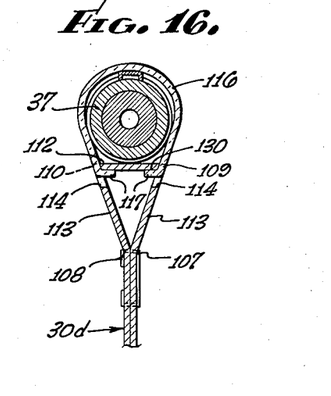
Fig. 16 is a sectional view taken in a tranverse plane indicated by line XVI—XVI of Fig. 15.
Figure 17:
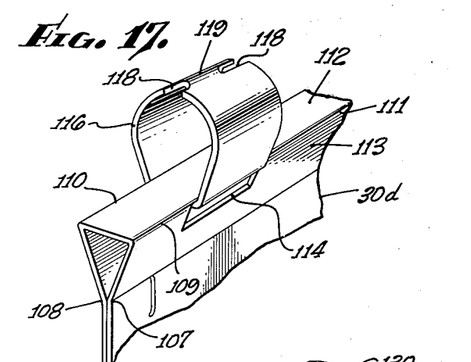
Fig. 17 is a fragmentary perspective view of the construction shown in Fig. 15 with the writing instrument removed.

In the embodiment of this invention shown in Figs. 15 to 17 inclusive, support means 20d may be of any suitable form and construction, such as a receptacle similar to that shown in the first embodiment, and including a back wall 105 of greater height than the front wall 106 so as to position holding panels 30d of rectangular shape at an angle therein. Suitable means, such as that shown in the first embodiment, may be provided in the bottom of the receptacle to retain holding panels 30d in upright relation.

The holding panel 30d in this embodiment of the invention is formed in somewhat different manner than that of the prior embodiments. A rectangular sheet of rigid paper stock material may be scored along four selectively spaced parallel lines at its central portion, said score lines being indicated at 107, 108, 109 and 110. Score lines 107, 108, 109 and 110 permit reverse folding of holding panel 30d into a triangular section frontal edge portion 111 by positioning score lines 107, 108 opposite each other to provide one apex of the triangular section. Score lines 110 and 109 define the other two apices of the triangular section. Staples adjacent the score lines 107, 108 secure the folded panel. The frontal edge portion 111 thus provides a flat front edge face 112 of a width greater than the thickness of the stock and approximately and preferably not exceeding that of the diameter of the writing instrument 37. Outwardly diverging diagonal walls 113 of frontal portion 111 may be provided with aligned pairs of spaced rectangular ports 114 to receive retaining means for writing instrument 37.

In this example, the positioning and retaining means for the writing instrument 37 may comprise a pair of similarly formed generally C-shaped clips 116 of suitable resilient plastic material. Each clip 116 may include inturned bottom edge elements 117 adapted to be snapped into ports 114. The top central portion of the clip 116 may be relieved by oppositely directed recesses 118 to provide a relatively narrow section 119. A recess 118 may receive therein a projection on the instrument, such as a pocket clip, to prevent turning of the instrument about its axis and simultaneously act as an abutment restraining longitudinal movement. The narrow section 119 provides a resilient yieldable section of material which permits expanding the clip to insert a writing instrument therein and to spread apart elements 117 to pass therebetween front face 112 and to snap into ports 114 in diagonal walls 113. The elements 117 engage as at 130 the front wall forming the face 112 and hold the instrument in slight pressure engagement therewith.

Figure 18:
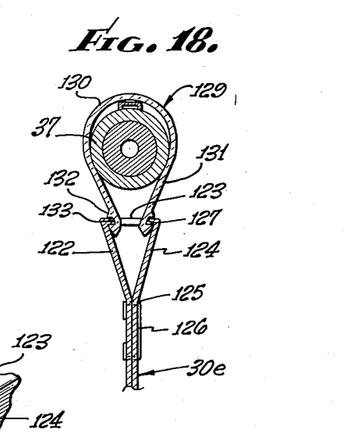
Fig. 18 is a transverse sectional view of a modification of the instrument retaining means shown in Figs. 15—17 inclusive.
Figure 19:
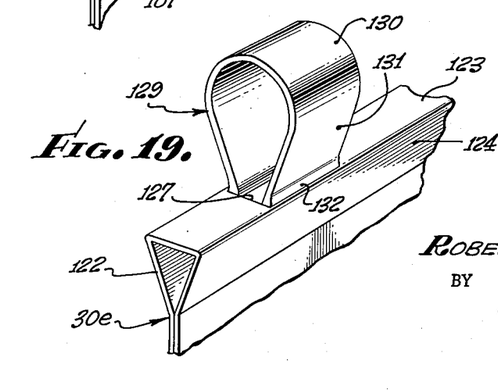
Fig. 19 is a fragmentary perspective view of the construction of Fig. 18 without an instrument.

In the embodiment of the invention shown in Figs. 18 and 19, the means for positioning and retaining a writing instrument on the frontal edge portion of a holding panel are somewhat different from that disclosed in Figs. 15–17.

Holding panel 30e may be formed in a manner similar to holding panel 30d and is provided with a frontal edge portion 122 of triangular section defined by a front wall 123 and diagonal walls 124 joined at 125 and secured by staples 126. The front wall 123 may be provided with a pair of longitudinally spaced rectangular openings or ports 127, only one of which is illustrated.

Each port 127 cooperates with a resilient clip 129 of suitable resilient metal or plastic material, said clip including a generally semi-cylindrical intermediate or central portion 130 formed between and having extended therefrom slightly converging leg portions 131. The end extremity of each leg portion 131 may be formed with a relatively thick section 132, said section 132 being provided with an outwardly facing recess or groove 133 adapted to receive a longitudinal edge margin of wall 123 defining port 127.

The clip 129 may be readily assembled on a writing instrument by spreading apart the leg portions 131 and snapping the clip thereover so that the writing instrument is substantially received within the semi-cylindrical intermediate portion 130. To attach the writing instrument to holding panel 30e a clip 129 may be positioned so that the edge margin of port 127 is aligned with and receivable within groove 133. The clip 130 may then be turned about the engaged edge margin so that the opposite leg portion 131 may be inserted into port 127 by squeezing together said leg portions to align and engage groove 133 of the other leg portion with the opposed edge margin of port 127. As the squeezing pressure on the leg portions 131 is relieved, the leg portions 131 spread outwardly into clip retaining engagement with front wall 123 of holding panel 30e.

One of clips 130 may be provided with a notch (not shown) in its intermediate portion similar to recess 118 so as to receive a projection on the writing instrument and to limit relative rotation of the writing instrument with respect to the clip. It will be noted that in this embodiment of the invention, the writing instrument may be spaced from the front face of the front wall 123.

While the front walls 112 and 123 of the examples shown respectively in Figs. 16 and 18 are illustrated with a lateral dimension or width less than the width of a writing instrument, this invention contemplates that the width of such front walls may exceed the width of the instrument to provide further and other desired display characteristics or appearances. Such a wider front wall may readily be provided by spacing apart a greater distance the fold lines defining the front wall. The positioning and retaining means such as clips 116 or 129 may be secured or attached to the frontal edge portion in a manner similar to that described. The wider front wall may be provided with a color or decorative treatment which will afford a pleasing contrast to the elongated article displayed thereon in order to create a selected aesthetic appeal.

Figures 2, 3, 4, 20:
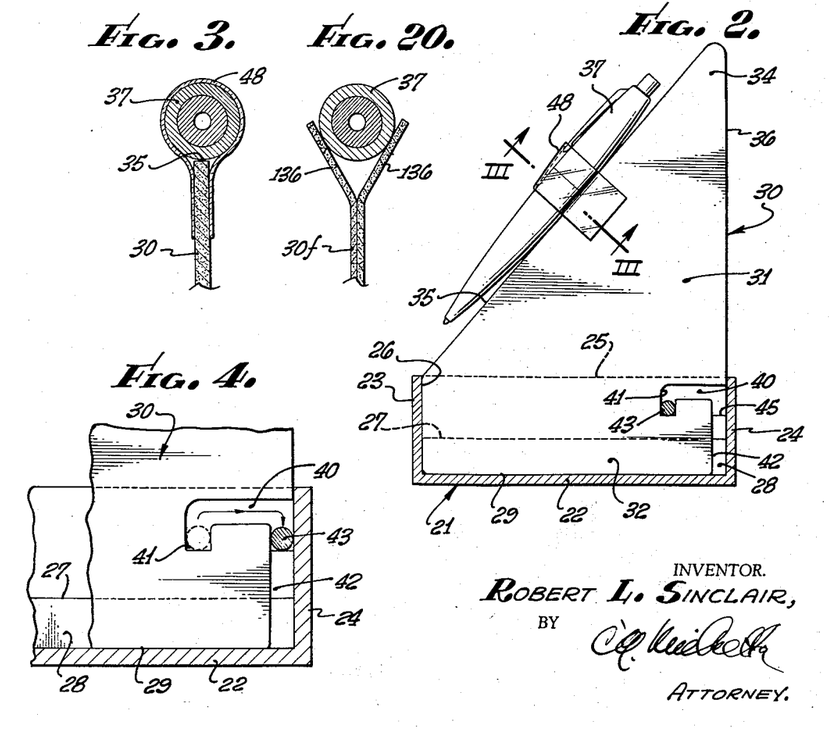
Fig. 2 is a sectional view of Fig. 1 taken in a vertical transverse plane passing between two writing instruments and holding panels therefor.
Fig. 3 is a sectional view taken in the plane indicated by line III—III of Fig. 2.
Fig. 4 is a fragmentary sectional view taken in the same plane as Fig. 2 and showing lock means for the panels in release position.
Fig. 20 is a fragmentary transverse sectional view of a modified holding panel construction.

It is understood that the frontal edge portion may comprise a single edge face of a holding panel of single-ply rigid paper stock, a double edge formed by two-ply paper stock, or a front wall formed by folding the paper stock in the manner described. In Fig. 20, a holding panel of folded form or of two-ply paper stock may be provided with a frontal edge portion of outwardly opening V shape as defined by diagonal, diverging edge margins 136 of a holding panel 30f. The V section formed by the divergent edge margins 136 may provide a seat for the writing instrument 37 which may be positioned and secured thereon as by a suitable positioning and retaining means described hereinabove such as that shown in Figs. 1, 5 and 9.

It will be noted that in the several embodiments of this invention, the frontal edge portion forming the display zone may comprise a straight plain edge face means (Fig. 1), an edge face means terminating in a rearwardly directed beveled edge (Fig. 6) or rounded edges (Fig. 9), an edge face means having forwardly extending projections or extensions at opposite ends thereof (Fig. 14) or an edge face means having forwardly outwardly diverging edge margins presenting a front edge face wider than the thickness of the panel stock (Figs. 16, 18, 20) for seating or positioning a writing instrument in longitudinal relation therewith.

It will be understood that various other modifications and constructions of positioning and retaining means may be employed to mount a writing instrument in edgewise relation to a holding panel in a display zone at an edge of the panel. The several modifications described above illustrate various article-holding means or sales packages for so mounting a writing instrument so that the frontal edge portion of a holding panel is substantially obscured and when a plurality of such writing instruments are assembled together in a supporting means in a display device such writing instruments may be positioned closely together in parallel relation. In ball point writing instruments employing retracting means the positioning and retaining means above described permits testing of the retracting mechanism by actuation thereof, except in the embodiments of Figs. 5-9, such retracting mechanisms usually including axially disposed or side mounted actuated elements or buttons.

For example, in the embodiment of Figs. 10-14 inclusive, the writing tip of the pen may be projected by actuation of the top button. Since the writing tip extends beyond the edge of the holding panel, the pen may be held in substantially normal manner with the panel on top and upright so that the tip may contact a surface for test writing. It will thus be apparent that, if desired, the length of the frontal edge face and the longitudinal positioning of the writing instrument thereon may be such that the writing tip may project beyond the panel for contact with a writing surface for testing without removal of the panel from the writing instrument. The invention contemplates that the longitudinal relationship of the pen with respect to the frontal edge portion may be such as to permit test writing by a customer.

It will also be understood that the several holding or positioning and retaining means for the elongated article or writing instrument may be transparent, colored or opaque as described hereinabove and that the transparent material may completely envelop and enclose the writing instrument if desired and as shown in the embodiment of Figs. 5-8 inclusive.

It should be particularly noted that in each embodiment of this invention a holding panel is provided which supports edgewise thereof an elongated article and which extends rearwardly from the article a substantial distance amounting to several times and more the width or lateral dimension of the article carried thereby. This dimensional construction of the holding panel not only affords a means for facilitating the display of elongated articles in a novel manner but also provides a positive deterrent to those who may desire to pilfer the article.

It should also be noted that in each of the examples of this invention described above a pilfer-deterring sales package or display device for an elongated article of merchandise is provided by a card-like panel sufficiently extensive in area to inhibit surreptitious concealment on a person and that securement or holding means adjacent an edge of the panel permanently hold the article in fixed association with the panel. The securement means of the examples includes abutment portions blocking longitudinal movement of the elongated article and includes a marginal portion of the panel, an article-holding element, and means permanently associating the article-holding element to the marginal portion of the panel. In the examples of this invention the article is incapable of separation or release from its associated panel member except by permanent destruction of the positioning and holding function of at least some part of the securement means. For example, in Fig. 1 the adhesive tape 48 must be severed, torn or permanently removed from the edge margin of the panel; in Fig. 5 the pod 62 must be slit or ruptured in some manner or the staples 64 broken and removed, etc.

All such changes and modifications coming within the scope of the appended claims are embraced thereby.

I claim:

1. A display device for elongated articles and the like, comprising: a support for a plurality of panels; a plurality of holding panels each presenting an elongated frontal edge portion of triangular section, the frontal edge portion of each holding panel being adapted to support an elongated article longitudinally of the edge portion, and longitudinally spaced holding elements firmly engaging said edge portion and adapted to embrace and hold an elongated article in longitudinally extending position on said edge portion; said support being adapted to support said plurality of panels in adjacent relation.

2. A display device as stated in claim 1, wherein the holding elements are virtually transparent and an elongated article held thereby is readily visible, the frontal edge portion is provided with ports and the holding elements include means extending into said ports and engaging the edge portion.

3. A pilfer-deterring sales package for an elongated article of merchandise to be displayed in self-service retail establishments for handling by prospective purchasers, said sales package comprising a panel member of relatively stiff material sufficiently extensive in area to inhibit surreptitious concealment on one's person, the opposite sides of said panel member being adapted to bear advertising and sales messages designed to promote the sale of said article of merchandise, and securement means adjacent an edge of said panel member for permanently holding the elongated article of merchandise in fixed association with said panel member in the vicinity of and parallel to said edge, said securement means having abutment portions blocking longitudinal movement of said elongated article of merchandise, said securement means including a marginal portion of said panel member, an article-embracing element and means permanently connecting said element to said marginal portion of the panel member, at least some part of said securement means being manually destructible to release said article of merchandise from its associated panel member, and said article of merchandise being incapable of separation from its associated panel member without permanent destruction of at least some part of said securement means.

4. A pilfer-deterrent sales package as stated in claim 3 wherein the marginal portion of said panel member includes a reverse fold of the material of the panel member to assist in holding the elongated article of merchandise in fixed association with said panel member.

5. A pilfer-deterrent sales package as stated in claim 3 wherein the marginal portion of said panel member includes forwardly extending portions at its ends and a recess therebetween.

6. A pilfer-deterrent sales package as stated in claim 3 wherein the article-embracing element comprises a transparent, rupturable material.

7. A pilfer-deterring sales package for a writing instrument to be displayed in self-service retail establishments for handling by prospective purchasers, said sales package comprising a panel member of relatively stiff material sufficiently extensive in area to inhibit surreptitious concealment on one's person, the opposite sides of said panel member being adapted to bear advertising and sales messages designed to promote the sale of said writing instrument, and securement means adjacent an edge of said panel member for permanently holding the writing instrument in fixed association with said panel member in the vicinity of and parallel to said edge, and with its writing tip projecting beyond said securement means and said panel member to permit testing of the writing instrument for writing ability while still associated with said panel member, said securement means having abutment portions blocking longitudinal movement of said writing instrument, said securement means including a marginal portion of said panel member, a transparent element embracing said writing instrument and means permanently connecting said element to said marginal portion of the panel member, at least some part of said securement means being manually destructible to release said writing instrument from its associated panel member, and said writing instrument being incapable of separation from its associated panel member without permanent destruction of at least some part of said securement means.

8. A pilfer-deterring sales package containing a writing instrument having a point project-retract mechanism including a finger-actuated control element, said packaged writing instrument to be displayed in self-service retail establishments for handling and testing by prospective purchasers, said sales package comprising a panel member of relatively stiff material sufficiently extensive in area to inhibit surreptitious concealment on one's person, the opposite sides of said panel member being adapted to bear advertising and sales messages designed to promote the sale of said writing instrument, and securement means adjacent an edge of said panel member permanently holding the writing instrument in fixed association with said panel member in the vicinity of and parallel to said edge, and with its writing point projecting beyond said securement means and said panel member to permit testing of the writing instrument for writing ability while still associated with said panel member, said finger-actuated control element of the project-retract mechanism of the writing instrument projecting beyond said securement means for easy access to permit manual operation of said project-retract mechanism to project and retract the writing point of the writing instrument while the latter is still associated with said panel member, for testing as aforesaid, said securement means having abutment portions blocking longitudinal movement of said writing instrument, said securement means including a marginal portion of said panel member, a transparent element embracing said writing instrument and means permanently connecting said transparent element to said marginal portion of the panel member, at least some part of said securement means being manually destructible to release said writing instrument from its associated panel member, and said writing instrument being incapable of separation from its associated panel member without permanent destruction of at least some part of said securement means.

9. A pilfer-deterring sales package for an elongated article of merchandise to be displayed in self-service retail establishments for handling by prospective purchasers, said sales package comprising a panel member of relatively stiff material sufficiently extensive in area to inhibit surreptitious concealment on one's person, the opposite sides of said panel member being adapted to bear advertising and sales messages designed to promote the sale of said article of merchandise, and securement means adjacent an edge of said panel member for permanently holding the elongated article of merchandise in fixed association with said panel member in the vicinity of and parallel to said edge, said securement means having abutment portions blocking longitudinal movement of said elongated article of merchandise, and said securement means including a sheet of transparent flexible rupturable material encircling said article of merchandise, the margins of said sheet being permanently secured to said panel member, whereby on rupturing of said sheet of transparent material the article of merchandise held thereby near the edge of said panel member can be disassociated from said panel member.

10. A pilfer-deterring sales package for an elongated writing instrument to be displayed in self-service retail establishments for handling by prospective purchasers, said sales package comprising a two-ply panel member of relatively stiff material sufficiently extensive in area to inhibit surreptitious concealment on one's person, the opposite sides of said panel member being adapted to bear advertising and sales messages designed to promote the sale of said writing instrument, and securement means at an edge of said panel member for permanently holding the writing instrument in fixed association with said panel member at and parallel to said edge, said securement means including a rupturable sheet of transparent plastic material shaped to the approximate form of and encircling said writing instrument and having abutment portions for holding said writing instrument against longitudinal shifting, opposite margins of said transparent sheet being overlapping and extending at least part way into the panel member between the two plies thereof and securely held therein, said writing instrument being incapable of removal from its fixedly-associated panel member without permanent destruction of at least some part of said securement means.

11. A pilfer-deterring sales package containing a writing instrument having a point project-retract mechanism including a finger-actuated control element, said packaged writing instrument to be displayed in self-service retail establishments for handling and testing by prospective purchasers, said sales package comprising a panel member of relatively stiff material sufficiently extensive in area to inhibit surreptitious concealment on one's person, the opposite sides of said panel member being adapted to bear advertising and sales messages designed to promote the sale of said writing instrument, and securement means adjacent an edge of said panel member permanently holding the writing instrument in fixed association with said panel member in the vicinity of and parallel to said edge, and with its writing point projecting beyond said securement means and said panel member to permit testing of the writing instrument for writing ability while still associated with said panel member, said finger-actuated control element of the project-retract mechanism of the writing instrument projecting beyond said securement means for easy access to permit manual operation of said project-retract mechanism to project and retract the writing point of the writing instrument while the latter is still associated with said panel member, for testing as aforesaid, said securement means having abutment portions blocking longitudinal movement of said writing instrument, said securement means including a sheet of transparent flexible rupturable material encircling the body of said writing instrument, the margins of said sheet being permanently secured to said panel member, whereby on rupturing of said sheet of transparent material the writing instrument held thereby near the edge of said panel member can be disassociated from said panel member.

12. A pilfer-deterring sales package for an elongated writing instrument to be displayed in self-service retail establishments for handling by prospective purchasers, said sales package comprising a two-ply panel member of relatively stiff material sufficiently extensive in area to inhibit surreptitious concealment on one's person, the opposite sides of said panel member being adapted to bear advertising and sales messages designed to promote the sale of said writing instrument, and securement means at an edge of said panel member for permanently holding the writing instrument in fixed association with said panel member at and parallel to said edge, said securement means including a rupturable sheet of transparent plastic material shaped to the approximate form of, and completely encasing, said writing instrument, and blocking it against longitudinal shifting, opposite margins of said transparent sheet being overlapping and extending at least part way into the panel member between the two plies thereof and securely held therein, said writing instrument being incapable of removal from its fixedly-associated panel member without permanent destruction of at least some part of said securement means.

13. A device for displaying elongated writing instruments and inhibiting pilfering and impeding pocketing of such instruments, comprising: a virtually stiff, card-like panel having surface dimensions greatly exceeding the thickness of a writing instrument and a thickness materially smaller than the thickness of a writing instrument, said panel having a frontal edge portion; holding means adapted to embrace, position and hold a writing instrument longitudinally with respect to said frontal edge portion; said holding means being firmly and non-frictionally on said panel adjacent said frontal edge portion to virtually inseparably connect the writing instrument to the panel by said holding means, said holding means including abutment means to block the writing instrument against longitudinal and lateral movement, an instrument when held by said holding means being separable from said panel only by destruction of the holding means.

14. A device for displaying writing instruments as stated in claim 13, wherein the frontal edge portion includes a reverse fold of said panel cooperating with the holding means to position and hold a writing instrument.

15. A device as stated in claim 13, wherein the frontal edge portion of the panel includes forwardly directed sections at its ends and a recess therebetween for cooperation with holding and abutment means to position and hold a writing instrument.

16. A device as stated in claim 13, wherein the holding means include a portion arranged to cooperate with a pocket clip on a writing instrument to block a writing instrument against longitudinal movement.

17. A device as stated in claim 13, wherein the holding means are of transparent, flexible and rupturable material.

18. A device as stated in claim 13, wherein the holding means includes a holding element virtually inseparably connected to the panel and arranged to extend across a portion of a writing instrument.

19. A device as stated in claim 13, wherein the frontal edge portion includes diverging marginal edge portions to assist in positioning and holdnig a writing instrument with respect to the frontal edge portion.

20. A card-like device for displaying an elongated writing instrument, said device discouraging pilfering and impeding improper pocketing of a writing instrument so displayed, comprising, in combination: a writing instrument; a virtually stiff, card-like panel having surface dimensions greatly exceeding the thickness of said writing instrument and a thickness materially smaller than the thickness of said writing instrument, said panel having a frontal edge portion; and holding means firmly attached to said frontal edge portion embracing, holding and positioning said writing instrument longitudinally with respect to said frontal edge portion and virtually inseparably connecting said writing instrument to said panel by said holding means, said holding means including abutment portions to block the writing instrument against longitudinal and lateral movement, said writing instrument being separable from said panel only by destruction of some part of the holding means.

21. A card-like device as stated in claim 20, wherein the holding means includes a band in adhesive contact with the panel.

22. A card-like device as stated in claim 20, wherein the holding means includes longitudinally spaced holding elements, each embracing a portion of the writing instrument.

23. A device for displaying elongated writing instruments and inhibiting pilfering and impeding pocketing of such instruments, comprising, in combination: a writing instrument; a virtually stiff, card-like panel having surface dimensions greatly exceeding the thickness of said writing instrument and a thickness materially smaller than the thickness of said writing instrument, said panel having a frontal edge portion; holding means embracing, positioning and holding said writing instrument longitudinally with respect to said frontal edge portion; said holding means being firmly and non-frictionally on said panel adjacent said frontal edge portion to virtually inseparably connect the writing instrument to the panel by said holding means, said holding means including abutment means to block said writing instrument against longitudinal and lateral movement, said writing instrument being separable from said panel only by destruction of said holding means, the writing end of said writing instrument extending beyond said holding means, whereby said writing instrument may be tested for writing ability while firmly connected to said panel.

24. A device for displaying elongated writing instruments and inhibiting pilfering and impeding pocketing of such instruments, comprising, in combination: a plurality of writing instruments; a holding panel for each instrument, each holding panel comprising a virtually stiff, card-like panel having surface dimensions greatly exceeding the thickness of said instrument it is to display and a thickness materially smaller than the thickness of said instrument, said panel having a frontal edge portion; holding means firmly and non-frictionally attached to each panel adjacent said frontal edge portion, said holding means positioning its associated instrument longitudinally with respect to said frontal edge portion and restraining said instrument from longitudinal and lateral movement, said instrument being separable from said panel only by forceful disassembly and disengagement of the holding means from said panel; and a supporting rack provided with means for supporting said panels in substantially parallel relation with their frontal portions forwardly directed, whereby an array of instruments in substantially side-by-side relation is made visible.

25. A device as stated in claim 24 wherein said supporting rack is provided with means for supporting some of said panels with their frontal portions facing in a direction diametrically opposed to the direction in which other panels are facing.

26. A device as stated in claim 24 wherein the writing end of each writing instrument extends beyond its associated holding means and panel, whereby said instruments may be tested for writing ability while connected to said panel.

References Cited in the file of this patent

UNITED STATES PATENTS

| Number | Name | Date |
|---|---|---|
| 341,693 | Roeseler | May 11, 1886 |
| 404,594 | Buhler | June 4, 1889 |
| 481,188 | Northam | Aug. 23, 1892 |
| 558,432 | Sonn | Apr. 14, 1896 |
| 637,889 | Parker | Nov. 28, 1899 |
| 741,878 | Bogart | Oct. 20, 1903 |
| 884,256 | Addie | Apr. 7, 1908 |
| 2,004,679 | Tinnerman | June 11, 1935 |
| 2,047,097 | Dunbar | July 7, 1936 |
| 2,102,977 | Shoemaker | Dec. 21, 1937 |
| 2,123,774 | Forthoffer | July 12, 1938 |
| 2,529,367 | Baumgarth | Nov. 7, 1950 |
| 2,546,556 | Miller | Mar. 27, 1951 |